(12) United States Patent
Busch

(10) Patent No.: US 8,140,383 B2
(45) Date of Patent: Mar. 20, 2012

(54) DERIVED AND AUTOMATED KEY PERFORMANCE INDICATOR REPORTS

(75) Inventor: Carsten Busch, Weinheim (DE)

(73) Assignee: SAP AG, Walldorf (DE)

( * ) Notice: Subject to any disclaimer, the term of this patent is extended or adjusted under 35 U.S.C. 154(b) by 1127 days.

(21) Appl. No.: 11/957,975

(22) Filed: Dec. 17, 2007

(65) Prior Publication Data

US 2009/0157447 A1    Jun. 18, 2009

(51) Int. Cl.
*G06F 17/00* (2006.01)
(52) U.S. Cl. ...................................................... 705/7.38
(58) Field of Classification Search .................. 705/7.38
See application file for complete search history.

(56) References Cited

U.S. PATENT DOCUMENTS

| | | | |
|---|---|---|---|
| 5,426,781 A | 6/1995 | Kaplan et al. |
| 5,539,903 A | 7/1996 | Kaplan et al. |
| 5,630,122 A | 5/1997 | Kaplan et al. |
| 5,787,278 A | 7/1998 | Barton et al. |
| 6,301,590 B1 | 10/2001 | Siow et al. |
| 6,633,851 B1 | 10/2003 | Engler et al. |
| 6,801,910 B1 | 10/2004 | Bedell et al. |
| 7,000,182 B1 | 2/2006 | Iremonger et al. |

*Primary Examiner* — Thomas Dixon
(74) *Attorney, Agent, or Firm* — Fish & Richardson P.C.

(57) ABSTRACT

In a computing system, a selection of a predefined key performance indicator that is associated with a plurality of predefined dimensions and with definitional data is received. A dimension value for at least one of the predefined dimensions, at least first and second attributes associated with the dimension value, and a condition that defines a relationship between the first and second attributes are also received. A first reporting format is determined using the dimension value, first and second attributes, and the condition, and second and third reporting formats are determined using the definitional data. A report view formatted according to the first, second, and third reporting formats is displayed on a display device.

20 Claims, 10 Drawing Sheets

US 8,140,383 B2

DERIVED AND AUTOMATED KEY PERFORMANCE INDICATOR REPORTS

TECHNICAL FIELD

This disclosure relates to generating electronic reports for measuring performance of business aspects.

BACKGROUND

Businesses can measure performance of the business as a whole or of an individual business unit within the business by comparing actual performance to one or more performance benchmarks. The performance benchmarks can include budgets or schedules that may be created for various aspects of the business or business unit. The budgets or schedules may represent targets, goals, or minimally acceptable levels of production, productivity, efficiency, or profitability, for example. The budgets or schedules may also correspond to a time period, such as a fiscal year or fiscal quarter, to a project like a development effort or business initiative, or to an employee, a team, or a department. To measure performance, the budgets or schedules, which may represent planned performance, can be compared to the actual performance of the business or business unit over the same period.

Businesses also frequently use computer-implemented software applications for managing and performing tasks related to the day-to-day operation of the business. The software applications may be used to receive or generate data or information that may be stored in electronic storage devices. Because this data relates to operations performed in the course of business, the data may be useful in assessing actual performance of the business, whether for a current period or an historical period.

SUMMARY

This disclosure relates to generating electronic reports for measuring performance of business aspects.

In a first general aspect, a computer-implemented method for providing a report view includes receiving a selection of a predefined key performance indicator that is associated with a plurality of predefined dimensions and with definitional data. The method also includes receiving a dimension value for at least one of the predefined dimensions, and receiving at least first and second attributes associated with the dimension value and a condition that defines a relationship between the first and second attributes. The method further includes determining a first reporting format using the dimension value, first and second attributes, and the condition, determining second and third reporting formats using the definitional data, and displaying on a display device a report view formatted according to the first, second, and third reporting formats.

In various implementations, the report view may be a graph; the first reporting format may specify data sets to be included in the graph, the second reporting format may specify a horizontal axis of the graph, and the third reporting format may specify a vertical axis of the graph. The report view may be a table; the first reporting format may specify data sets to be included in the table, the second reporting format may specify rows of the table, and the third reporting format may specify columns of the table.

In various implementations, the method may further include retrieving a first data set associated with the predefined key performance indicator and the first attribute, and a second data set associated with the predefined key performance indicator and the second attribute, and displaying the report view may include formatting the retrieved first and second data sets according to the first, second, and third reporting formats. The second data set may be a reference data set. A threshold value that qualifies the condition may be received. The condition and the threshold value together may define a relationship between the first data set and the second data set, and an alert may be issued when the relationship is violated. The key performance indicator may be stored in an electronic repository and made available for selection to a plurality of external systems.

In a second general aspect, a computer-implemented method for providing a report view includes receiving a selection of a predefined key performance indicator that is associated with a plurality of predefined dimensions and with definitional data, where at least one of the predefined dimensions comprises a plurality of sub-dimensions. The method also includes receiving a dimension value for at least one of the predefined dimensions that comprises a plurality of sub-dimensions, where the dimension value specifies certain of the sub-dimensions. The method further includes receiving at least first and second attributes associated with the dimension value and a condition that defines a relationship between the first and second attributes. The method further includes determining a first reporting format using the dimension value, first and second attributes, and the condition, determining a second reporting format using the received dimension value, where the second reporting format specifies the certain sub-dimensions, and determining a third reporting format using the definitional data. The method further includes displaying on a display device a report view formatted according to the first, second, and third reporting formats.

In various implementations, the report view may be a graph; the first reporting format may specify data sets to be included in the graph, the second reporting format may specify a horizontal axis of the graph, and the third reporting format may specify a vertical axis of the graph. The report view may be a table; the first reporting format may specify data sets to be included in the table, the second reporting format may specify rows of the table, and the third reporting format may specify columns of the table.

In various implementations, the method may further include retrieving a first data set associated with the predefined key performance indicator and the first attribute, and a second data set associated with the predefined key performance indicator and the second attribute, and displaying the report view may include formatting the retrieved first and second data sets according to the first, second, and third reporting formats. A threshold value that qualifies the condition may be received. The condition and the threshold value together may define a relationship between the first data set and the second data set, and an alert may be issued when the relationship is violated.

In a third general aspect, a computer program product is tangibly embodied in a computer-readable medium and includes instructions that when executed by a processor perform a method for providing a report view. The method includes receiving a selection of a predefined key performance indicator that is associated with a plurality of predefined dimensions and with definitional data. The method also includes receiving a dimension value for at least one of the predefined dimensions, and receiving at least first and second attributes associated with the dimension value and a condition that defines a relationship between the first and second attributes. The method further includes determining a first reporting format using the dimension value, first and second attributes, and the condition, determining second and third reporting formats using the definitional data, and displaying on a display device a report view formatted according to the first, second, and third reporting formats.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
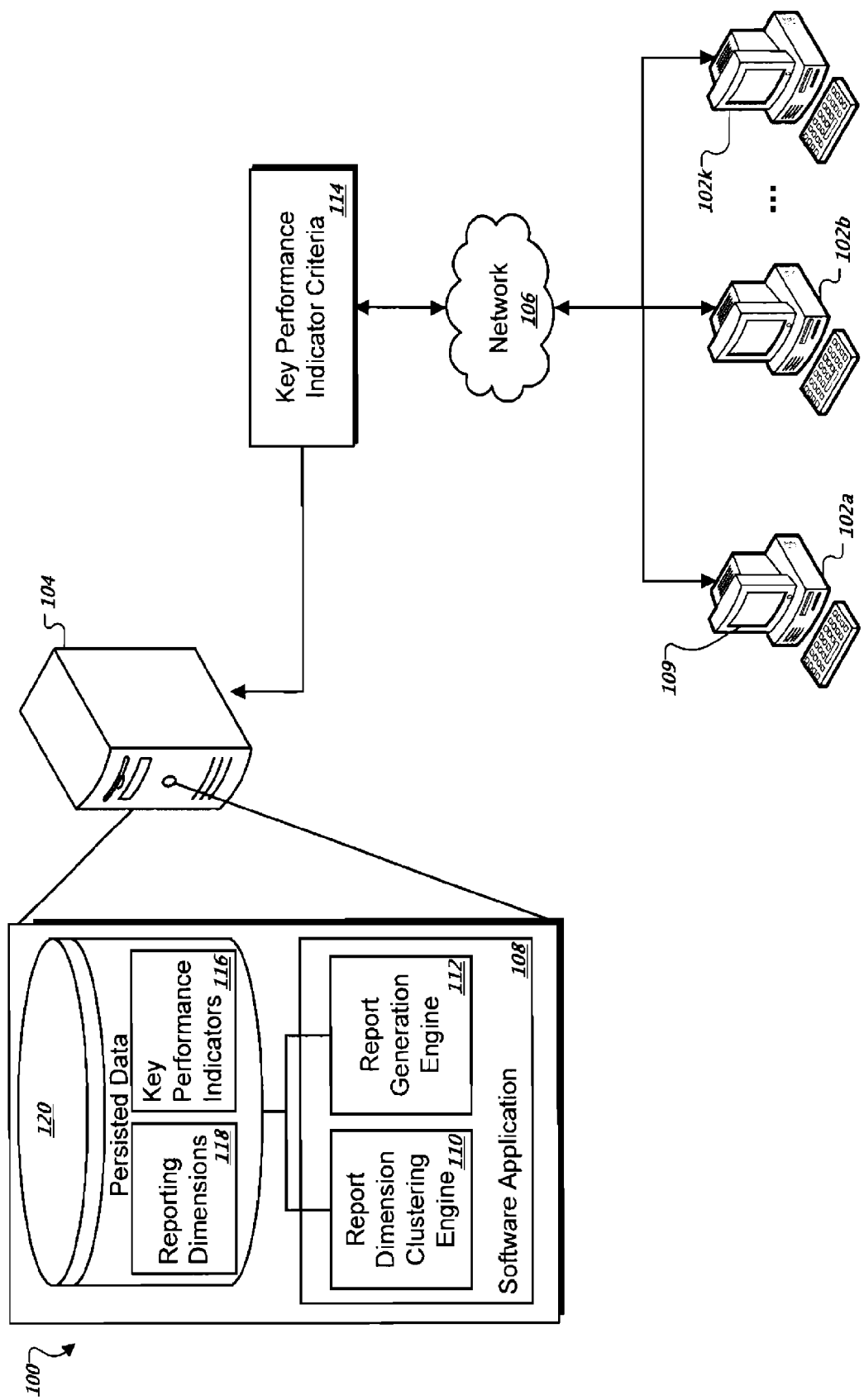
FIG. 1 is a block diagram of an exemplary system that can be used for dynamically generating and providing a report view.

FIG. 1 is a block diagram of an exemplary system 100 that can be used for dynamically generating and providing a report view. In some implementations, the report view can show a pre-analysis report, and can be generated dynamically without the benefit of a previously defined report definition file. The report view may be associated with a predefined key performance indicator. Key performance indicators (KPIs) may provide a means for measuring performance of a business or a organizational unit within a business. For example, key performance indicators can be used to generate report views that enable judging the performance of one or more business processes internally by time period, collaboratively in a supply chain, and externally by benchmarking against similar companies. Additionally, the key performance indicators may be associated with various dimensions of the key performance indicator, and a user or system may "drill down" into a report by dimension, which may facilitate improved root-cause analysis and improve the user experience. A dimension of a KPI may define an arrangement of the KPI, and each KPI may be independently associated with one or more dimensions. Users may select dimension values for the one or more dimensions to define a scope of measurement for the report view, which may permit focused and tailored report views that can improve a user's ability to perform root-cause analysis. Some examples of key performance indicators include, but are not limited to, revenue analytics, user analytics, delivery performance, forecast accuracy, warehouse analytics, and others.

The key performance indicator report can, for example, provide information about the KPI, including performance history, root cause analysis, status updates, or other information consumer pattern information. In some implementations, the key performance indicator may be customizable or personalized for a particular system or user. For example, a user at a customer site can define personalized key performance indicators based on the customer's business operations and objectives.

In some implementations, key performance indicators can express abstract business objectives in financial or physical units for comparative purposes. For example, key performance indicators pertaining to planning processes (e.g., demand planning, production planning, etc.) can be collected, measured, and transformed into physical or financial information. The information can be compared with known benchmarking criteria, for example. In some implementations, metric information is collected and evaluated to generate one or more performance reports based on planned criteria or previously benchmarked criteria of one or more selected key performance indicator.

In some implementations, the key performance indicators may be associated with an application that periodically monitors a key performance indicator automatically, as by periodically computing values for the indicator independent of any user request. In some implementations, an action may be performed if a deviation of predetermined magnitude exists between the calculated value and a planned or target value. Such a key performance indicator may, for example, be instantiated in a report, document, spreadsheet, map, graph, and the like, and may be used to provide an up-to-date continuous assessment of the corresponding performance aspect of the business process or organization, because the value associated with the indicator may be periodically or continuously updated in an automated fashion.

The key performance indicators or information describing the key performance indicators may be stored in one or more electronic repositories that provide a central location for storing and maintaining the key performance indicators, and that may be published to, and accessed from, any distributed system or machine within the global system 100. A user or a system may access the repository to browse available key performance indicators and configure indicator evaluation conditions for reporting purposes.

The system 100 can use selected evaluation conditions (e.g., condition attributes, dimension values) combined with a particular KPI definition to derive report criteria (e.g., report data, axis information, graphic type, measurement parameters, etc.) to dynamically generate key performance indicator reports, or pre-analysis reports. The system 100 provides the advantage of utilizing stored KPI definition data combined with user-entered data to derive report criteria. Thus, a KPI report can be automatically generated on the fly without a predefined report definition file.

In one example, a user may wish to view a historical performance report for a key performance indicator over a specific time period. In this case, a user or a system can access the repository, select the desired key performance indicator, and configure one or more reporting dimension values or other evaluation criteria. Examples of reporting dimensions can include, but are not limited to currency, value type, cost center, customer, product, fiscal year, calendar year, etc. In some implementations, the reporting dimension values may include predefined values associated with the selected key performance indicator. For example, an "annual sales" key performance indicator may generally include a twelve month time period over which the indicator is measured. The predefined value in this example is the length of the time period. In some implementations, a reporting dimension can include a user-selectable report property that provides information related to the selected key performance indicator.

In general, system 100 may cluster reporting dimensions into categories based on one or more properties of the dimensions. For example, the system 100 may cluster reporting dimensions into dimensions that can be aggregated (e.g., country, industry, customer, product, service, organizational unit, etc.), dimensions that cannot be aggregated (e.g., actual value, planned value, historical value, etc.), dimensions that specify a timeframe (e.g., fiscal year, calendar year, month, etc.), or dimensions used in a particular evaluation condition (e.g., value type, cost center, product line, etc.). Some dimensions may include two or more sub-dimensions. In some cases, such a dimension may be aggregated for a report view, such that the report view has scope consistent with the two or more sub-dimensions (or some subset of the sub-dimensions). In another report view, the scope of the view may be selected to focus on a single sub-dimension of the aggregatable dimension.

In some implementations, several reporting dimension values can be combined together to provide one aggregated reporting dimension. For example, system 100 may combine two or more reporting dimensions based on the type of measurement the dimension provides. In general, for dimensions that may be aggregated, two or more dimension values may be aggregated or grouped to form a dimension value consisting of a combination of the two or more dimension values. One such example includes a "days sales outstanding" key performance indicator that can be measured on a monthly-basis for the countries that a business sells products in (e.g., USA, Canada, Mexico, UK, Germany, France, Spain, Austria, Italy, etc.). The system 100 can, for example, aggregate the reporting dimension "country" to provide a report for the days of sales outstanding in all of the countries. In some implementations, aggregated reporting dimensions can be combined in reports with non-aggregated reporting dimensions, or single value reporting dimensions.

In operation, the system 100 can, for example, determine formatting criteria for a key performance indicator report view based on the definition of the KPI and one or more user-entered selections. For example, the formatting criteria can be dynamically determined based on one or more user-selected reporting dimensions and one or more selections associated with the dimensions. In a specific example, if the user selects a "sales" KPI and a specific product line as the reporting dimension, then the system 100 can dynamically determine the units of measurement for the report view (e.g., per product or per package), the variables to be included in the report view, and more by accessing the definition of the selected KPI and using the received information. In some implementations, the system 100 can dynamically determine the time period based on the KPI definition or a user-entered duration.

In some implementations, after the KPI and the desired reporting dimensions are selected, the user can further define evaluation conditions associated with the selected KPI. The evaluation conditions can include one or more attributes, thresholds, and other narrowing criteria, according to various implementations. In some implementations, the attributes may pertain to monitoring criteria such as cost, revenue, profit, time, efficiency, location, process, etc. A condition may define a relationship between two or more attributes, such as less than, greater than, in between, higher than, lower than, before, after, etc. A threshold may pertain to a condition set upon the attributes, and may qualify the condition, according to some implementations.

In one example, the entered reporting dimensions and the evaluation conditions can be stored with a corresponding KPI. If the reporting dimensions and the evaluation conditions are stored with the KPI, the system 100 can be configured to provide automated reports using the collectively stored data. Further, the system 100 may provide a central location to maintain the automated reports. By providing a central location for correlated data, the system 100 may facilitate publishing and distribution of the automated reports to various applications running on various systems. For example, a user working from a computing device or system may view the stored reports, or a list of available reports made available from an electronic data repository in system 100. The user or system may request a KPI calculation corresponding to one or more of the stored key performance indicators, and data may be accessed from one or more electronic data sources and used to compute a report view for the KPI.

In some implementations, the computed report values may be compared with a planned or target report value, and an action may be taken if the comparison reveals a deviation of at least a predetermined magnitude, for example. In this fashion, the system 100 may provide unified access to reports to a large number of systems, and the systems may access the reports and use valuations computed using the key performance indicators as part of business assessments. This may provide flexibility, as report views may be dynamically generated for various applications on various systems without dedicated configuration and maintenance of report structures for a particular application or a particular system, and without a large up-front expense associated with defining report definition templates or files. In addition, any individual system within the overall system may use reports and data associated with the key performance indicator in those reports, where the data may be stored on any of a group of electronic storage devices throughout the system 100.

Referring again to FIG. 1, the depicted exemplary implementation is illustrative, and many variations are possible. The system 100 includes one or more computing devices 102, which may themselves be referred to as systems (e.g., individual systems or distributed systems within the global system 100), and one or more server devices 104. The computing devices 102 and server 104 may be communicably coupled to one another over a network 106. While a single server device 104 and multiple computing devices 102 are shown in the example of FIG. 1, it will be appreciated by one skilled in the art that techniques described herein may be performed in a system including multiple server devices 104, as well as combinations of one or multiple computing devices 102. In some implementations, the techniques described herein may be performed by a system comprising a standalone computing device, such as a personal computer.

In general, computing devices 102 may be client devices, according to an implementation. The client devices 102 may be any computing device operable to connect or communicate with the server 104 or the network 106 using any communication link. At a high level, each client 102 may include or execute at least one graphical user interface (GUI) 109. A user may enter or view data under the guidance of the graphical user interface 109, which may provide views on a display of the computing device 102. In some implementations, an application program may be stored in the server device 104, while in other implementations the application program may be stored locally on a client device 102. Similarly, the application program may be executed either at the server end or the client end, or according to a combination of the above. There may be any number of clients 102 (e.g., 102a, 102b, . . . , 102k) communicably coupled to the server 104. As used in this disclosure, the client 102 is intended to encompass a personal computer, touch screen terminal, workstation, network computer, kiosk, wireless data port, smart phone, mobile phone, personal data assistant (PDA), one or more processors within these or other devices, or any other suitable processing device. For example, the client 102 may be a PDA operable to wirelessly connect with an external or unsecured network.

The server 104 can comprise an electronic computing device operable to receive, transmit, process and store data associated with the system 100. Although FIG. 1 illustrates one server 104 that may be used with the disclosure, the system 100 may be implemented using computers other than servers, as well as a server pool. The server 104 may be any computer or processing device, such as, for example, a blade server, general-purpose personal computer (PC), Macintosh, workstation, Unix-based computer, or any other suitable device. According to one implementation, the server 104 may also include or be communicably coupled with a web server and/or a mail server.

The server 104 may generally host a software application 108 for dynamically generating and providing key performance indicator reports to one or multiple systems, according to some implementations. The exemplary software application 108 shown in FIG. 1 includes a report dimension clustering engine 110 for aggregating reporting dimensions and a report generation engine 112 for generating KPI report views according to user-selected scope criteria, which views may be referred to as pre-analysis reports. The software application 108 may be operable to receive key performance indicator criteria 114 (e.g., from a user) associated with one or more predefined dimensions. The criteria 114 may be provided by a distributed computer system 102*a* or 102*b*, for example. In some implementations, a user of the software application 108 may provide key performance indicator criteria. For example, the user may enter reporting dimensions, dimension values, attributes, evaluation conditions, or thresholds in the process of requesting a particular KPI report. The software application 108 may then use the received information to generate a report view, which may include determining appropriate view formatting parameters, and retrieving stored data associated with the KPI and the received information. The application 108 may also store a value in an electronic storage location, transmit a value to the requesting system (e.g., system 102*a* or 102*b*), update a value in a report, use the value in a comparison, perform an action based on the a magnitude, sign, or combination of the value with another value, and the like. As is conventional, the software application may be stored in a nonvolatile storage location, internally or externally to the server 104, and may be transferred to memory (not shown for simplicity) for active use by the system 100.

As shown in FIG. 1, the key performance indicators 116 and the reporting dimensions 118 reside in a data repository 120 within the server 104. In other implementations, the key performance indicators 116 and the reporting dimensions 118 may be stored in one or more data repositories external to the server 104. Alternatively, portions of the key performance indicators 116 or the reporting dimensions 118 may be stored or maintained on one or more repositories within the server (such as repository 120), and other portions of the key performance indicators 116 and the reporting dimensions 118 may be stored on one or more external repositories. As described above, a given KPI may be associated with one or more reporting dimensions. The server 104 may execute the software application 108 and use report dimension clustering engine 110 or report generation engine 112 to perform the techniques described herein for generating report views, maintaining the key performance indicator data 116 or the reporting dimensions 118, and responding to requests for report generation from distributed computer systems 102 within the system 100.

The server 104 also includes control devices (not shown in FIG. 1 for simplicity). The control devices may include one or more processors to execute instructions and manipulate data for performing the operations of the server 104. The control devices may include, for example, one or more central processing units (CPUs), a blade, application specific integrated circuits (ASICs), field-programmable gate arrays (FPGAs), or other suitable hardware or software control systems. In the illustrated implementation, the control devices execute instructions that comprise the application program 108.

The network 106 facilitates wireless or wired communication between the server 104 and any other local or remote computing devices or data stores within the system 100, such as client devices 102. The network 106 may be all or a portion of an enterprise or secured network. In another example, the network 106 may be a virtual private network (VPN) between the server 104 and the client 102 across a wireline or a wireless link. While illustrated as a single or continuous network, the network 106 may be logically divided into various subnets or virtual networks without departing from the scope of this disclosure, so long as at least a portion of the network 106 may facilitate communications between the server 104 and at least one client (e.g., client 102*a*).

Users of the application 108 may include, for example, executives, department managers, product managers, financial service or accounting personnel, customer service personnel, field applications personnel, or any other users of business information who wish to track performance or perform a business assessment. The following descriptions focus on the operation of the application 108, or one of its components or sub-modules (e.g., report dimension clustering engine 110 or report generation engine 112), in performing one of the respective methods or processes. However, the system 100 contemplates using any appropriate combination and arrangement of logical elements implementing some or all of the described functionality.

Figure 2:
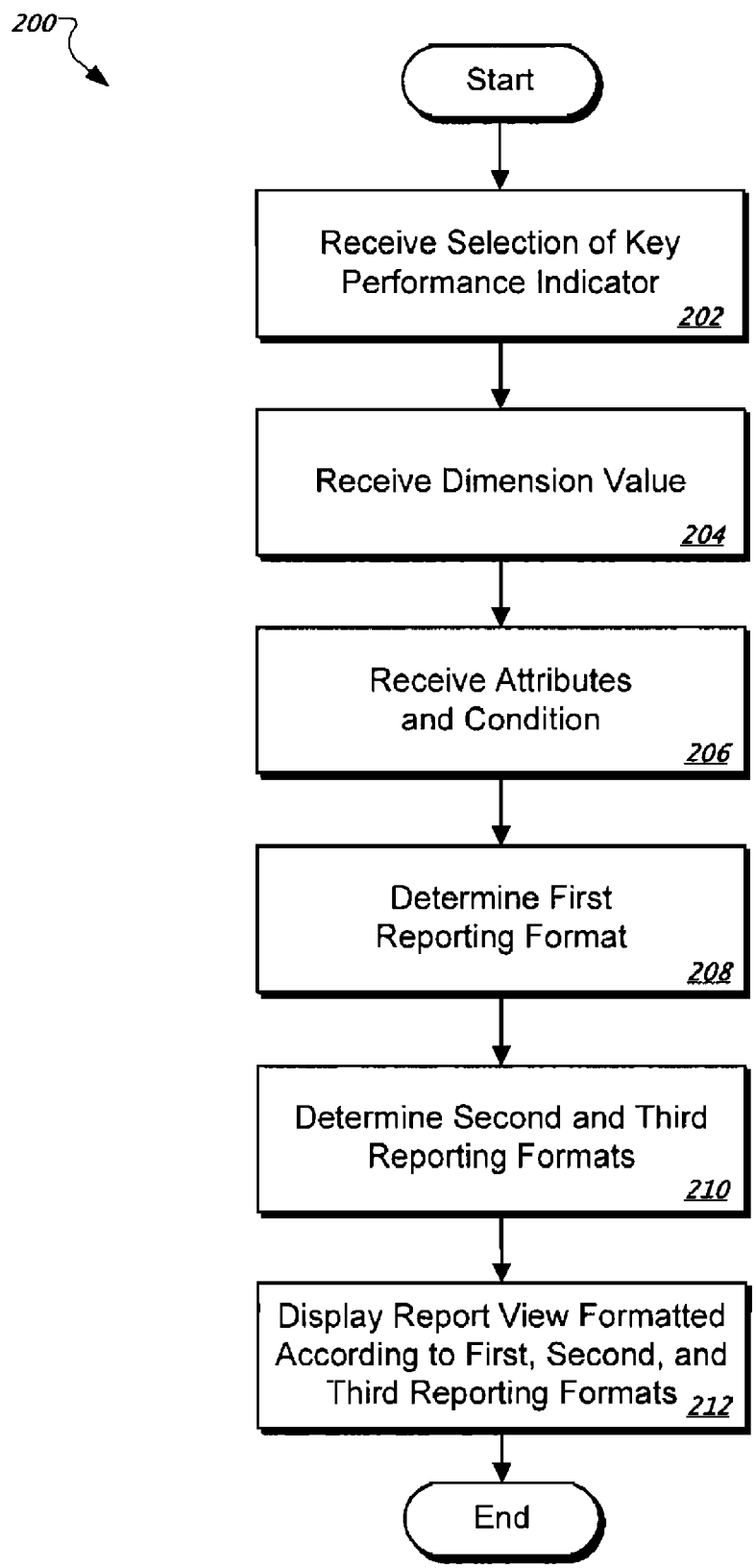
FIG. 2 is a flow chart of exemplary operations that can be performed to provide a report view.

FIG. 2 is a flow chart of exemplary operations 200 that can be performed to provide a report view. A process begins at step 202 with receiving a selection of a key performance indicator. For instance, a user may select a predefined KPI using a client device, which may transmit the selected KPI to a server over a network where it may be received by a software application. In some implementations, the selected KPI can be associated with a plurality of predefined dimensions and/or associated with definitional data. That is, the dimensions may be predefined for a given KPI, and a user may select values for the dimensions as appropriate. Examples of predefined dimensions may include cost centers, currency, customers, time periods, products, project data, sales offices, reference material, values, and other KPI-associated parameters. The definitional data may generally include one or more predefined parameters that represent meaning in the KPI. For example, definitional data for a "forecast accuracy" KPI may include a standard time frame for each forecast accuracy KPI report, such as monthly or bi-weekly.

A dimension value may be received at step 204. The dimension value may correspond to at least one of the predefined dimensions. For example, a user may select one or more predefined dimensions and provide one or more dimension values for those predefined dimensions using the client device and submit the value to the server over the network. In one example, the software application can receive the dimension value or values and apply the value to one or more requested KPIs to dynamically generate a report view. An example of a predefined dimension may include a currency. The dimension values for the predefined dimension currency may include the U.S. dollar, the Euro, the Franc, the Pound, the Yen, etc.

Attributes and condition values may be received at step 206. The attributes and condition values can generally provide evaluation criteria that specify the scope of the KPI report. For example, first and second attributes associated with the dimension value may be received, and a condition that defines a relationship between the attributes may be received. For example, the dimension "calendar year" can be a predefined dimension for a particular KPI. The "calendar year" can provide a time frame that is specified in increments such as quarters, months, weeks, days, etc. The evaluation criteria can be used to narrow the scope of a report that includes the "calendar year" dimension. For example, the attributes may include a begin date and an end date that narrows the scope of a KPI report. In general, a condition may define the relationship between the first and the second attribute. For example, the condition "is between" provides a relationship between the two dates entered. In a specific example, the user may enter a first attribute (e.g., a start date of Feb. 1, 2008), a condition (e.g., is between), and a second attribute (e.g., an end date of May 31, 2008) where the attributes are associated with the calendar year dimension, and where the condition specifies a relationship between the attributes. The attributes and conditions can be received by the software application. The application can use the received information or portions of it to retrieve information from a repository that includes KPI data and reporting dimension information relevant between Feb. 1, 2008 and May 31, 2008 in the calendar year dimension. The user may provide attribute selections and conditions for each predefined dimension.

A first reporting format may be determined at step 208. The first reporting format may be determined using the received dimension value, received first and second attributes, and the received condition. The first reporting format may specify one or more data sets to be included in the report view. For example, if the report view includes a graph, the first reporting format may specify data sets to be included in the graph of the report view. If the graph is a line graph, for example, each of the included data sets may be represented as a line in the line graph. If the report view includes a table, the first reporting format may specify data sets to be included in the table of the report view. In some implementations, the first reporting format may specify the layout of dimensions in a report, such as the column headers in a table-formatted KPI report.

A second reporting format and a third reporting format may be determined in step 210. In some implementations, the second and third reporting formats may be determined using definitional data associated with the selected KPI. Taken together, the first, second, and third reporting formats may specify a report view format that the system can use to dynamically generate and display a report view on a display device. In some implementations, if the report view includes a graph, the second reporting format may specify a horizontal axis of the graph, and the third reporting format may specify a vertical axis of the graph. Three-dimensional graphs may also be presented in some implementations, in which case a fourth reporting format may be determined and may specify the remaining axis of the graph. In some implementations, if the report view includes a table, the second reporting format may specify rows of the table, and the third reporting format may specify columns of the table. In some implementations, the second reporting format may be retrieved from the definition of the selected KPI. For example, the rows in the table may include the available predefined dimensions. The rows in the table may also include dimension values associated with the dimensions. The third reporting format may specify the columns in a table-formatted KPI report. In some implementations, the third reporting format may be derived from the selected attributes and conditions.

An automatically generated report view is displayed formatted according to the first, the second, and third reporting formats in step 212. For example, the software application may use the determined first, second, and third reporting formats to generate a report view according to the reporting formats. The report view may be sent to one or more clients and displayed on a display device of the client, for example.

As an example, the software application may receive a KIP indicator that is associated with a plurality of predefined dimensions and with definitional data. The application may also received a dimension value for at least one of the predefined dimensions, and first and second attributes associated with the dimension value and a condition that defines a relationship between the first and second attributes. The application may determine a first reporting format using the dimension value, the first and second attributes, and the condition, and may determine second and third reporting formats using the definitional data. The application may then display a report view on a display device.

Figure 3:
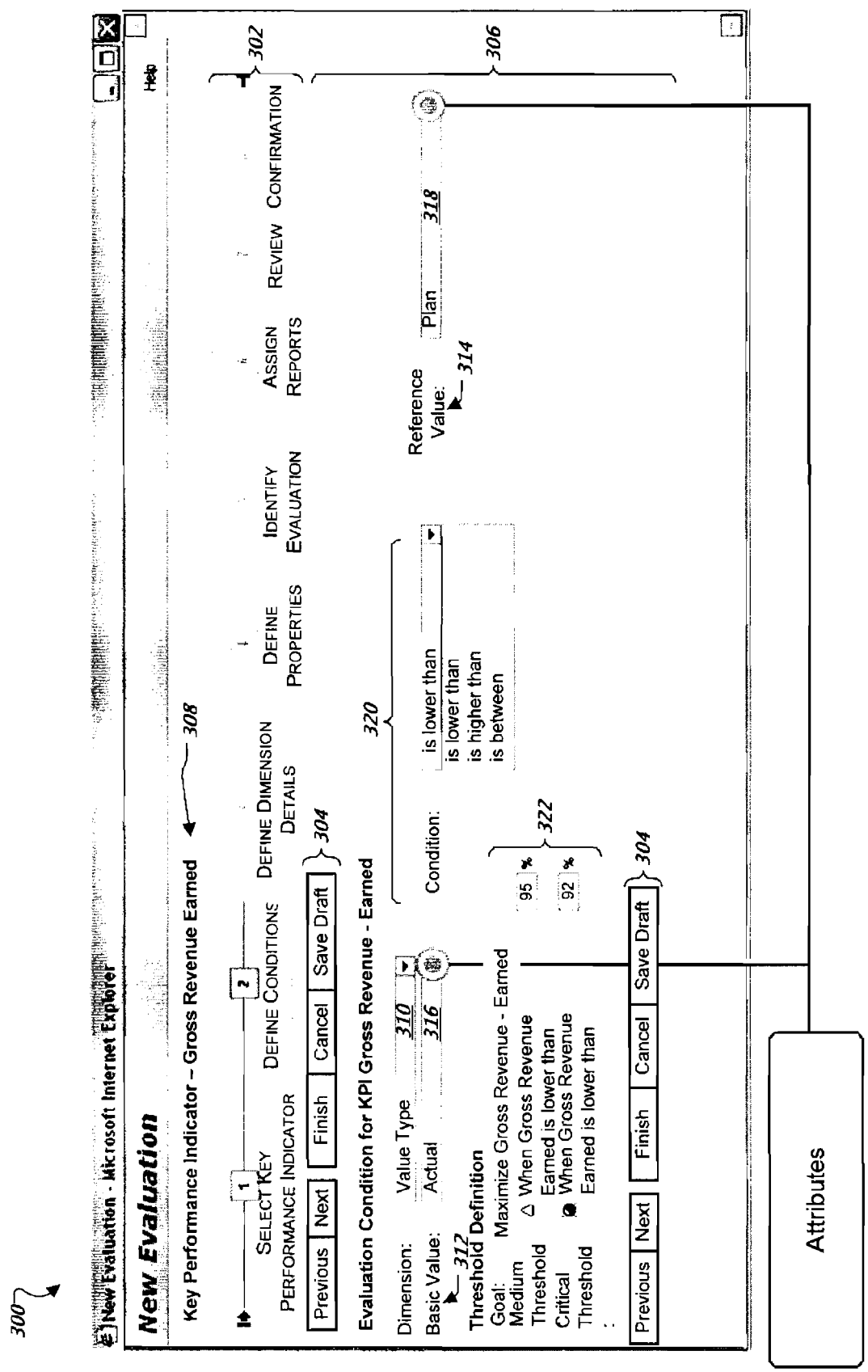
FIG. 3 is a screen shot of an exemplary user interface that can be used to receive report view specification information.

FIG. 3 is a screen shot of an exemplary user interface 300 that can be used to receive report view specification information. The user interface 300 depicts an example configuration screen for requesting a key performance indicator evaluation. The user interface 300 includes a configuration menu 302 for defining evaluation criteria, a controls area 304 for traversing through the configuration menu, and a work area 306 for entering evaluation conditions such as a dimension, attributes, a condition, thresholds, rules, and the like. FIG. 3 is exemplary, and any number of display areas may be presented. Similarly, these display areas may be located at any appropriate place within the user interface.

The configuration menu 302 may be used to navigate the system user through the steps of selecting a key performance indicator through confirming the evaluation configuration. The user can start at step 1 (in menu 302) to select a key performance indicator and continue on to step 2 to define conditions for the KPI. Other options in menu 302 may include defining report dimensions, defining properties, identifying evaluations, assigning reports, and reviewing and confirming any or all selections. In some implementations, more or fewer options may be provided to the user.

The controls area 304 may allow the system user the ability to quickly change views or move between steps or menu items in menu 302. As shown, the controls 304 include a previous control to return the user to a previous view, a next control to advance the user to the next view, a finish control to save changes and finish the evaluation configuration, a cancel control to cancel modifications made in the current view, and a save draft control to save a draft of the evaluation as currently configured.

The work area 306 may provide options to the user based on the configuration menu 302. For example, the work area 306 can change depending on the menu item selected in menu 302. If the user changes menu items, the work area 306 may be updated to provide relevant data to the user. The work area 306 may include attributes, thresholds, conditions, report dimensions, and reports, just to name a few examples.

As shown in FIG. 3, the user has requested a new KPI evaluation and selected a key performance indicator. The selected key performance indicator in the depicted example is a "gross revenue earned" KPI 308, and may have been selected, for example, in step 1 of the configuration menu 302. Selection of the gross revenue earned KPI 308 can invoke presentation of predefined dimensions in the work area 306. For example, the gross revenue earned KPI 308 may be associated with one or more predefined dimensions.

Predefined dimensions for the selected KPI may be presented to the user for selection. For example, the user may select a particular predefined dimension and configure dimension values for each selected dimension. In general, the user may select one or more predefined dimensions to be included in the KPI evaluation. The user can identify, for a given dimension, evaluation conditions for the KPI including a condition, condition attributes, and thresholds.

In the depicted example, the user selected a "Value Type" dimension in dropdown control 310. The "Value Type" dimension may be associated with a list of attributes. The list of attributes may include predefined conditions, user-defined conditions, and other data related to the "Value Type" in a KPI. The attributes can be stored in repository 120 with the reporting dimensions 118, or can be stored in an external storage location accessible by the server 104.

As shown, the "Value Type" dimension 310 includes a "Basic Value" attribute 312 and a "Reference Value" attribute 314. The user may provide values for the attributes 312 and 314 by selecting from a list of predefined values. As shown in FIG. 3, the user has selected the dimension value "Actual" 316 for the "Basic Value" attribute 312 and the dimension value "Plan" 318 for the "Reference Value" attribute 314.

The first dimension attribute 316 may represent an actual value for the Gross Revenue KPI and the second dimension attribute 318 may represent a planned value for the KPI. In some implementations, the first attribute 316 can represent current or actual information while the second attribute 318 can represent a reference data set, such as a budgeted—for set, a historical set, a competitive set, a goal set, and the like. For example, a planned value is generally used as a reference when measuring the performance of the gross revenue over time.

As shown, the user has also selected a condition 320 to define a relationship between the first attribute 316 and the second attribute 318. Here, the condition 320 is the relation "is lower than." The user-entered evaluation condition entered in interface 300 may invoke software application 108 to generate a KPI report covering a time period, and may indicate one or more periods during the time period when an actual value for gross revenue earned is lower than a planned value for the gross revenue earned. Such an indication may be provided in various ways. For example, a color change may indicate an interval (which may be a subset of the total period covered by the report) where gross revenue earned is lower than a planned value, as by shading or coloring (e.g., red) that portion of the report, such as a portion of a graph or table. Other options may include textual notification of the periods of interest, a change in line style for a line graph, shading or hatching, and the like. In this fashion, a user may define one or more conditions that, upon report view generation, may enable the user to view the report and quickly identify areas of particular interest. In some implementations, the condition may be used with one or more threshold values, which are described below in more detail. In some implementations, other attributes can be associated with the dimension "Value Type" 310 and reports can be generated based on the other attributes, or a combination of attributes.

In addition to selecting attributes, the user may define one or more threshold values 322. A threshold value or values 322 may qualify a condition 320. That is, a threshold value may place a further limitation on a condition, such that the relationship defined by the condition for the attributes is further qualified. As such, a condition and a threshold value can define a relationship between a first data set (e.g., an actual performance value) and a second data set (e.g., a planned performance value). Further, an action can be taken when appropriate based on the condition and the attributes, or based on the condition, the threshold, and the attributes. For example, when the actual performance value violates the configured threshold, an alert can be issued based on the violation of the configured threshold.

In one example, the threshold value 322 can be used as a condition for issuing an alert associated with a key performance indicator. For example, an alert can be generated when a value reaches a particular level, percentage, number, etc. The exemplary threshold definition 322 shown in interface 300 includes a goal, a medium threshold, and a critical threshold. The user in this example entered a maximize gross revenue goal with a medium threshold that can trigger an alert when the actual gross revenue is lower than 95% of the planned gross revenue, and a critical threshold that can trigger an alert when the actual gross revenue is lower than 92% of the planned gross revenue. The alert can include an email, a phone call, a report generation, or other communication to a user or multiple users indicating the threshold may have been met.

Figure 4:
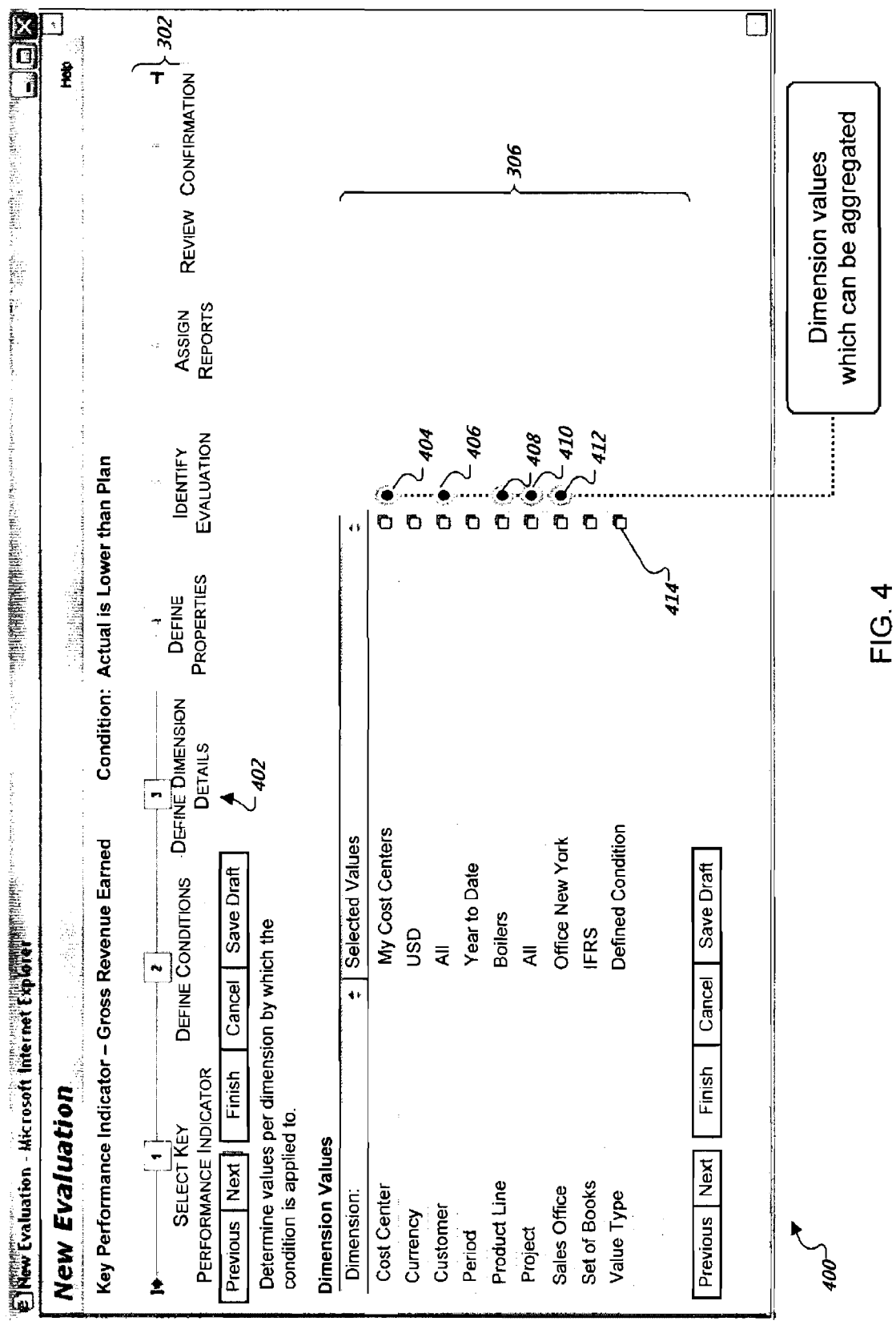
FIG. 4 is a screen shot of an exemplary user interface that can be used to receive dimension reporting criteria associated with the key performance indicator in the interface of FIG. 3.

FIG. 4 is a screen shot of an exemplary user interface 400 that can be used to receive dimension reporting criteria associated with the key performance indicator in the interface of FIG. 3. The interface 400 shows selectable dimension values. The user interface 400 can be used to specify scope by selecting dimension values that define conditions for the selected KPI (shown in FIG. 2). As described above, the dimensions are predefined for a given KPI, but the user may select values for the dimensions as appropriate. In this fashion, a user may define a scope of the measure to be reported in the dynamically generated report view.

As shown in FIG. 4, the configuration menu 302 has been advanced to a "Define Dimension Details" setting 402. The view 402 can provide more detailed information for the previously selected KPI (e.g., gross revenue earned) and the previously entered information (e.g., actual value type is lower than plan). In particular, the work area 306 now shows dimension values for each of the dimension types available for the gross revenue earned KPI. For a given dimension of the KPI, a user may select an appropriate dimension value, and the system may dynamically generate a report view using the entered information. Although, only the value type dimension was selected in the previous screen shot 300, a user may select other dimensions (e.g., using the drop-down list associated with the "Dimension" field of work area 306 in FIG. 3) and provide corresponding information for those dimensions. In some implementations, the user may choose to add or delete any number of dimensions.

In some implementations, a dimension may include two or more sub-dimensions or values. For these dimensions, the two or more sub-dimensions values can be aggregated together to provide one aggregated reporting dimension, according to some implementations, and the scope of the generated report view can reflect this aggregation of sub-dimensions. For example, system 100 may cluster one or more dimensions based on the type of measurement the dimension provides.

In some implementations, the dimension value list in work area 306 can be automatically suggested by the system. For example, the system may provide relevant dimensions based on the selected key performance indicator, or a selected attribute. Users may select one or more of the listed dimensions to view KPI evaluation data or report attributes related to the dimension. A user may provide dimension values for each of the predefined dimensions in interface 300 (FIG. 3) or here in user interface 400. The data entered into screen shots 300 and 400 may be used to automatically generate a list of KPI evaluation reports associated with the selected KPI and the entered information, including the dimension values.

In some implementations, user interface 400 may provide an indication of the dimensions that may be aggregated. In the example shown, the marked dimensions 404-412 include a mark indicating that the dimensions can be aggregated. The dimensions in interface 400 that can be aggregated include a cost center dimension, with shown selected value "My Cost Centers" 404, a customer dimension, with shown selected value "All" 406, a product line dimension, with shown selected value "Boilers" 408, a project dimension, with shown selected value "All" 410, and a sales office dimension with a value, with shown selected value "Office New York" 412. Considering the dimension "Customer," the selected value ("All") may represent an aggregation of all of the customers that a business may have. Aggregations that include subsets of available sub-dimensions are also possible. For example, the selected value "My Cost Centers" for the "Cost Center" dimension may represent an aggregation of those cost centers for which the user has responsibility, which may comprise a subset of the total number of cost centers associated with the business. In this fashion, a user may advantageously select dimension values to focus the scope of the report view to be generated such that the user may be able to quickly and easily drill down and perform effective analysis.

The work area 306 may include one or more value help icons 414. The value help icons 414 can be selected or accessed to provide section-relevant help to a user while entering report criteria and other business information. For example, a user may select a value help icon 414 to access more information about the form or field the user may be accessing. In some implementations, the icon 414 may be hovered-on or selected to provide a user with further information about the field. For example, the user may use a pointing device to hover over the icon 414, as by positioning a cursor over the icon 414 using a mouse, for example, to view a list of dimension values possible for that dimension, including potential sub-dimensions. Value help icons 414 may display on any, all, or none of the selectable fields in the application. In some implementations, value help icons 414 may be enabled and disabled as configured by the user. The value help menu may include several selectable values dependent on the attribute selected. In this example, the value help menu may include various other value types that a user can select from. This may provide a convenient way for a user to select a desired value amongst a list or table of values or options, and the most relevant options may be presented based on the KPI evaluation reports described herein. While this example shows a value help icon 414, a drop-down list indicator may function similarly, and the system may use relationships to present relevant and appropriate choices in a similar fashion.

The configuration screens 300-400 can be utilized to setup a new evaluation for a KPI. The configuration screens may include more or fewer screens than depicted in screens 300-400 (e.g., such as including a screen associated with selecting a KPI), and features of the depicted or described screens may be combined or separated in any appropriate fashion. In the examples of the previous screens, one or more KPI dimension evaluations are generically configured for the gross revenue earned KPI. In particular, the user-entered configuration information can be used by server 104 to identify and generate one or more KPI evaluations that may indicate a time period when an actual value of a KPI was lower than the planned value of the same KPI, in this example. The server 104 can use the configured evaluation and the KPI definition to dynamically generate a KPI report. One example KPI report may provide historical information based on a time when an actual product cost was lower than the planned product cost. The report can be configured to generate weekly, monthly, or by some other increment. The generated report can be generically derived and executed based on the recurrence of the measure (monthly) and the selected reporting dimension (e.g., Value Type). In general, it is an advantage of some implementations of the system 100 to provide automated or derived reports without prior configuration of the report content.

Figure 5:
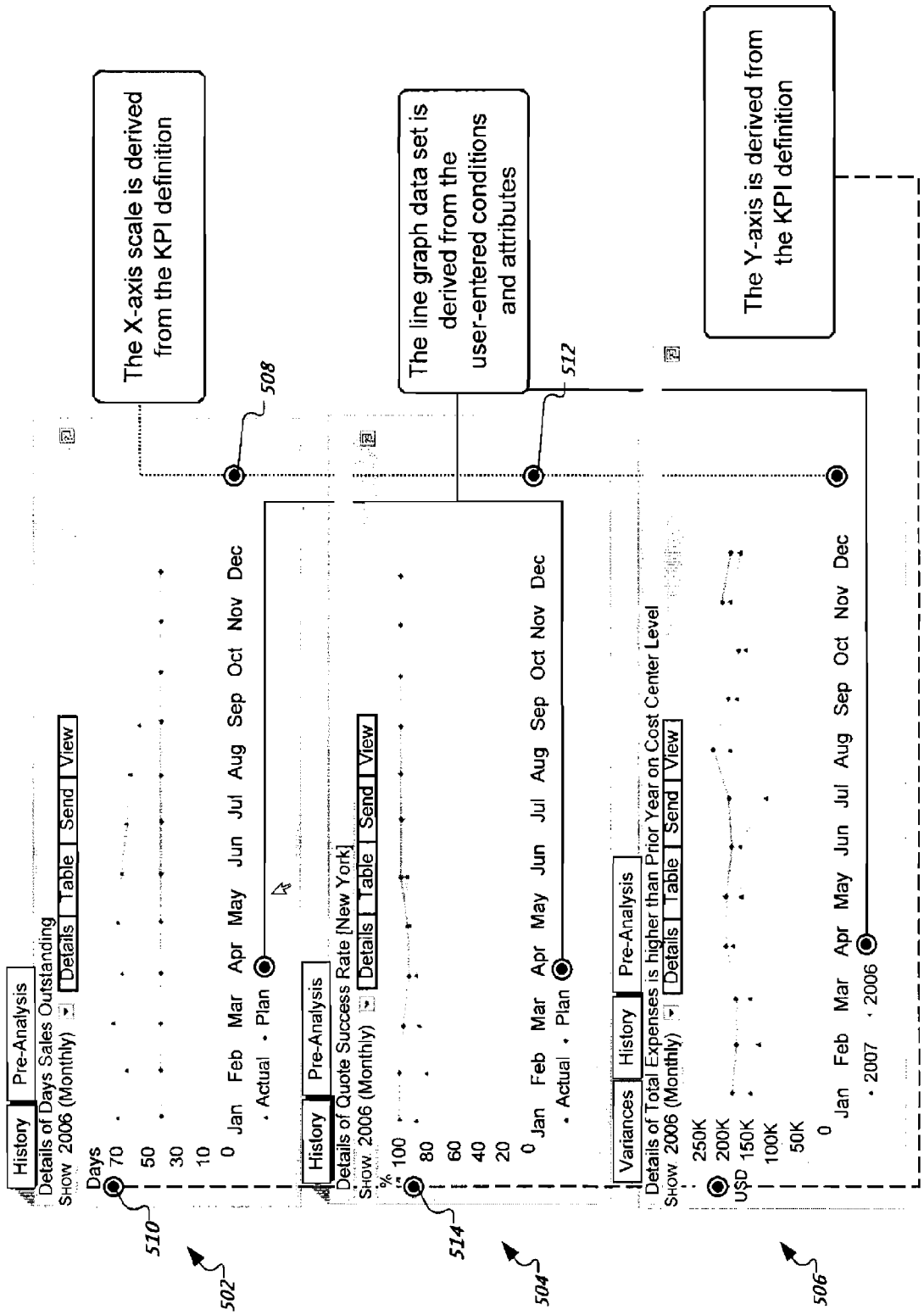
FIG. 5 is a collection of exemplary report views in graphical form.
Figure 6:
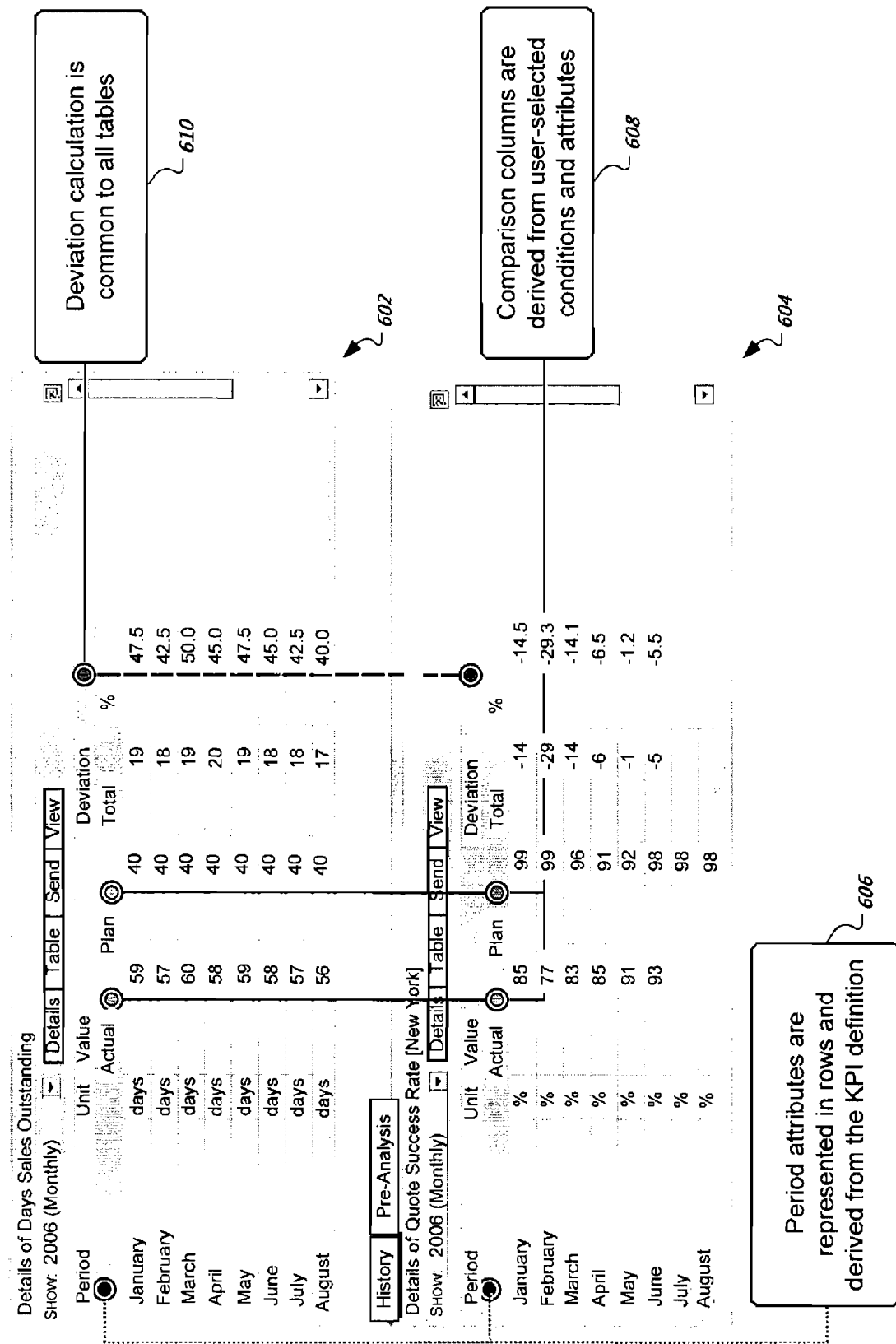
FIG. 6 is a collection of exemplary report views in tabular form.

FIGS. 5 and 6 represent KPI report views based on the performance of a "Days Sales Outstanding" key performance indicator. The "Days Sales Outstanding" KPI may represent a number of days a business takes to collect on its accounts receivable. The report views are based on a configured evaluation entered by a user and on definitional information associated with the KPI. The configured evaluation may be created in a similar fashion to the evaluation example shown in FIGS. 2-4. In the "Days Sales Outstanding" example, the user entered a company level evaluation to compare the days of sales outstanding for the entire company and across all customers, all countries, all industries, all organizational units, and all products/services on a year to date basis, whereby the deviation of the actual versus the planned values should be calculated.

As shown in FIGS. 5 and 6, the KPI report views can include text, tables, graphics, tabs, links, sorting criteria, timestamp information, and controls. The KPI report view may present data content using an Information Consumer Pattern (ICP). The ICP is a template which can be used in different variations for reporting purposes. The pattern may include a table (e.g., an analysis Web item) or a graphic (e.g., a chart Web item) in which report data content is displayed. The pattern can also include an application toolbar, which may include various pushbuttons and functions, depending on the variation of the pattern.

In the examples shown in this disclosure, the reports may include a history tab for showing performance information over time, a pre-analysis tab for showing performance information for a KPI at a requested interval, and in some instances may include a variance tab showing variances in data between one or more of the presented tabs. In various implementations, after a report view is generated the user can modify the report, send the report, save the report, view additional detail about the report, or view another report from inside the report.

FIG. 5 is a collection of exemplary report views in graphical form. In this example, three line graphs 502, 504, and 506 represent the performance history of actual data versus planned data for the "Days Sales Outstanding" KPI. The line graphs 502-506 may be automatically derived and generated using the definition of the key performance indicator, information entered by the user, and dimension details from system 100. The software application 108 can dynamically generate one or more information consumer patterns (e.g., reporting formats) for a selected KPI. The information consumer patterns may be used to create KPI reports or report views without using a predefined report structure. In general, KPI report views may be generated according to determined reporting formats, such as according to a first reporting format (e.g., data from the performance of a KPI), a second reporting format (e.g., rows of a table or a horizontal axis), and a third reporting format (e.g., columns of a table or a vertical axis). The data for the reports may be retrieved from one or more data stores. The actual data may have been collected and stored by one or more back-end processing systems, for example, and the planned data may have been entered by a user and stored at an earlier time.

The line graph 502 depicts the details of the "Days Sales Outstanding" KPI. In the depicted example, an x-axis scale 508 may be automatically derived from the definition of the "Days Sales Outstanding" KPI. For example, according to definitional data, the "Days Sales Outstanding" KPI may generally be calculated on a monthly basis. Thus, the x-axis scale 508 is shown in months. Similarly, a y-axis scale 510 (Days) can also be automatically derived from the definition of the "Days Sales Outstanding" KPI, according to some implementations. These may represent the second and third reporting formats in the flow chart 200 of FIG. 2, according to an implementation.

The data sets used to create the lines in the line graph 502 may be derived from the user-selected conditions and attributes. These may represent the first reporting format in the flow chart 200 of FIG. 2, according to an implementation. For example, the user may previously configure a "Days Sales Outstanding" KPI evaluation to include the "Value Type" dimension having the attributes "Actual" 512 and "Plan" 514. Thus, a KPI report (e.g., line graph 502) can be generated using the derived x and y axes and the user-selected conditions and attributes without using a predefined report structure, template, or report definition file.

In a similar fashion, the line graphs 504 and 506 can be generated using the same or different derived axes information and user-selected conditions and attributes. For instance, the bar graph 504 depicts a report for a second dimension available in the "Days Sales Outstanding" KPI. The second dimension is a "Details of Quote Success in the New York office" dimension. The derived x-axis 512 is shown in months, as with bar graph 502, but the y-axis 514 is shown as a percentage. The data sets for the line graph 504 may be derived from the user-selectable conditions and attributes.

The line graph 506 depicts a user-configured evaluation condition for the "Days Sales Outstanding" KPI evaluation configuration. The evaluation condition is used to provide report data when total expenses are higher than a prior year for a particular cost center. When met, the evaluation condition may automatically invoke generation of a KPI report (e.g., the graph 506). The data shown in graph 506 is derived in a similar fashion to the examples described above.

FIG. 6 is a collection of exemplary report views in tabular form. The reports shown include a "Details of Days Sales Outstanding" table 602 and a "Details of Quote Success Rate [New York]" table 604. The table 602 depicts the data sets used to create the line graph 502 (FIG. 5). Similar to the creation of the line graph 502, the system 100 can generate the tables 602 and 604 using user-selected conditions, attributes, and the KPI definition. For example, "Period" attributes 606 are represented in rows and can be derived from the KPI definition. In general, any number of comparison columns 608 may be derived from the user-selected conditions and attributes. As shown, the comparison columns 608 include an Actual column and a Plan column. The comparison columns 608 may correlate to a dimension value configured by a user in a KPI evaluation.

The tables 602 and 604 both include a Deviation column 610 that provides a deviation calculation. In this example, the deviation calculation provides a deviation between the actual value and the planned value for the "Days Sales Outstanding" KPI. In some implementations, the deviation column can be provided as a default report detail. Other implementations may generate report tables that do not include a deviation column.

Figure 7:
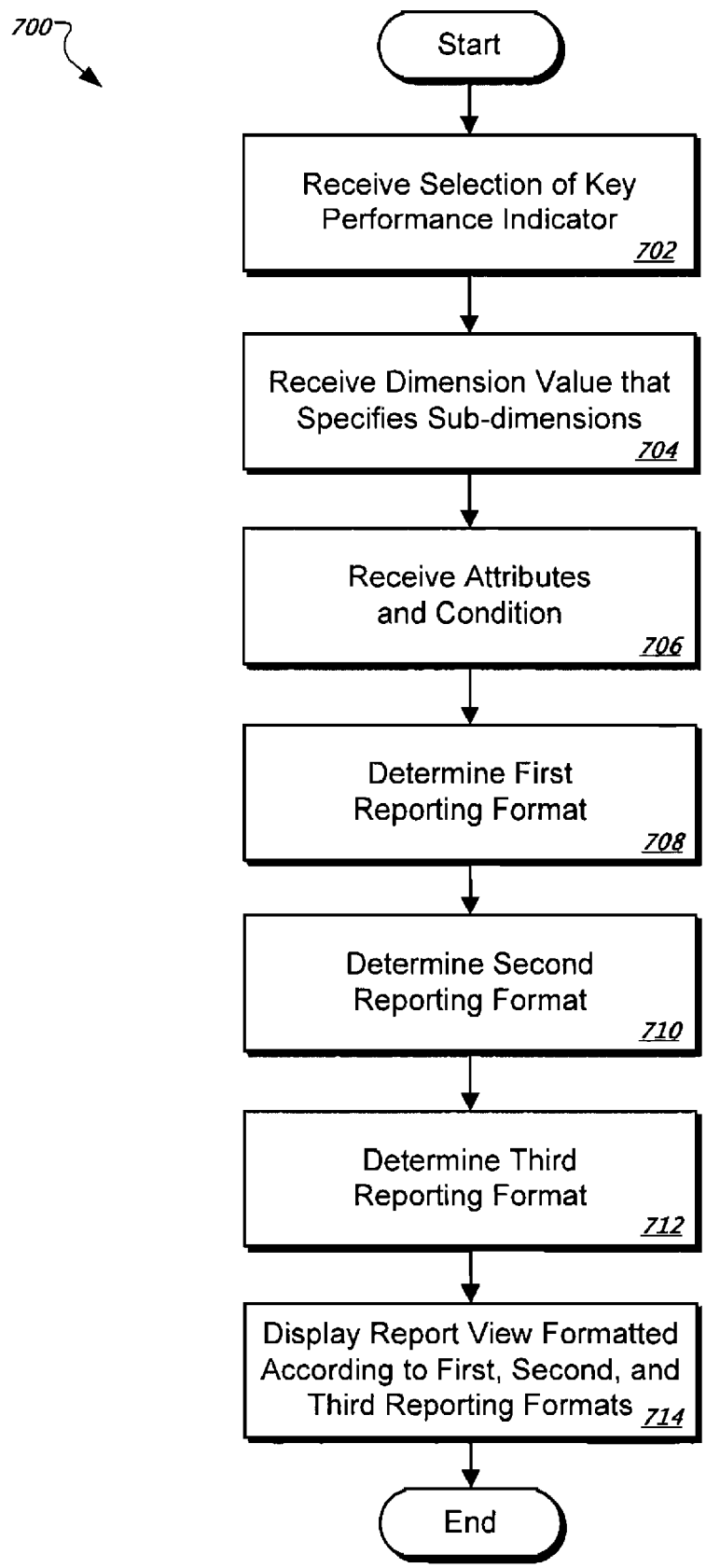
FIG. 7 is a flow chart of exemplary operations that can be performed to provide a report view.

FIG. 7 is a flow chart of exemplary operations 700 that can be performed to provide a report view. A process begins at step 702 with receiving a selection of a key performance indicator. For instance, a user may select a predefined KPI using a client device. In some implementations, a user may browse a catalog of available KPIs with corresponding descriptions, and may select an appropriate KPI that meets the analytic needs of the user. The selected KPI can be transmitted to a server over a network and received in a software application. In some implementations, the selected KPI can be associated with a plurality of predefined dimensions and/or associated with definitional data. The predefined dimensions may include cost centers, currency, customers, time periods, products, project data, sales offices, reference material, values, and other KPI associated parameters, to list just a few examples. In some implementations, one or more of the predefined dimensions may be associated with two or more sub-dimensions. Sub-dimensions may permit "drilling down" analysis of the KPI on a particular dimension, which may permit targeted analysis.

A dimension value that specifies sub-dimensions may be received at step 704. That is, a dimension value may be received for at least one of the dimensions that comprises a plurality of sub-dimensions. The dimension value may specify certain of the sub-dimensions. For example, a user may select a single sub-dimension as the value, an aggregation of multiple sub-dimensions that together comprise a subset of the available sub-dimensions for the dimension, or an aggregation of all of the available sub-dimensions for the dimension.

The system can create report views using aggregated dimensions, and the report views may be used to drill down on one or more KPIs to change the focus of a particular KPI report. In some cases, drill downs may be possible on more than one dimension simultaneously. For example, a user may view a KPI report showing profits for a product line, and can drill down into the report by selecting a sub-dimension, such as country. If the user selects to view the KPI report showing profits for a product line and drilled down by the sub-dimension country, then the KPI report may shift from showing all profits for the product line to showing all profits for the product line for each country. In some implementations, all available drill-down possibilities may be available for selection via a control, such as a drop-down control or list control, from the report view, and may be controlled to display a desired drill-down view.

Attributes and condition values may be received at step 706. The attributes and condition values may generally provide evaluation criteria that specify the scope of the KPI report. For example, the dimension "product line" can be a predefined dimension for a particular KPI. The "product line" can provide a set of data that specifies the products made by a company. The attributes and condition values may be used as evaluation criteria to narrow the scope of a report that includes the "product line" dimension. For example, the attributes may include a manufactured date and a sold by date as attributes. One or more conditions may be applied to the two attributes. Example conditions may include expressions such as "is more than 2 years before." Here, the attributes and condition can be configured to form the phrase: the manufactured date is more than 2 years before the sold by date. This phrase may be used to generate a report for a recall, for example.

A first reporting format may be determined at step 708. The first reporting format may be determined using the received dimension value, received first and second attributes, and the received condition. The first reporting format may specify one or more data sets to be included in a report view. For example, if the report view includes a graph, the first reporting format may specify data sets to be included in the graph of the report view. If the graph is a bar graph, for example, each of the included data sets may be represented as a bar in the bar graph. If the report view includes a table, the first reporting format may specify data sets to be included in the table of the report view. In some implementations, the first reporting format may specify the layout of dimensions in a report, such as the column headers in a table-formatted KPI report view.

A second reporting format may be determined in step 710. The second reporting format can be determined using the received dimension value, and may specify the certain sub-dimensions for the report view, according to some implementations. For example, the system 100 may determine sub-dimensions according to a user-entered dimension value. A third reporting format may be determined in step 712. The third reporting format can be determined using definitional data of the selected KPI, according to some implementations. For example, the third reporting format may specify the rows or columns in a table for a KPI report view.

An automatically generated report view is formatted according to the first, the second, and third reporting formats, and displayed in step 714. For example, the software application may use the determined first, second, and third reporting formats to generate a report view according to the determined the reporting formats, and may populate the report view with data retrieved from one or more data repositories. The report view may be sent to one or more clients and displayed on a display device in a graphical user interface, for example. The report view may include text, tables, graphics, tabs, links, sorting criteria, timestamp information, and controls.

Figure 8:
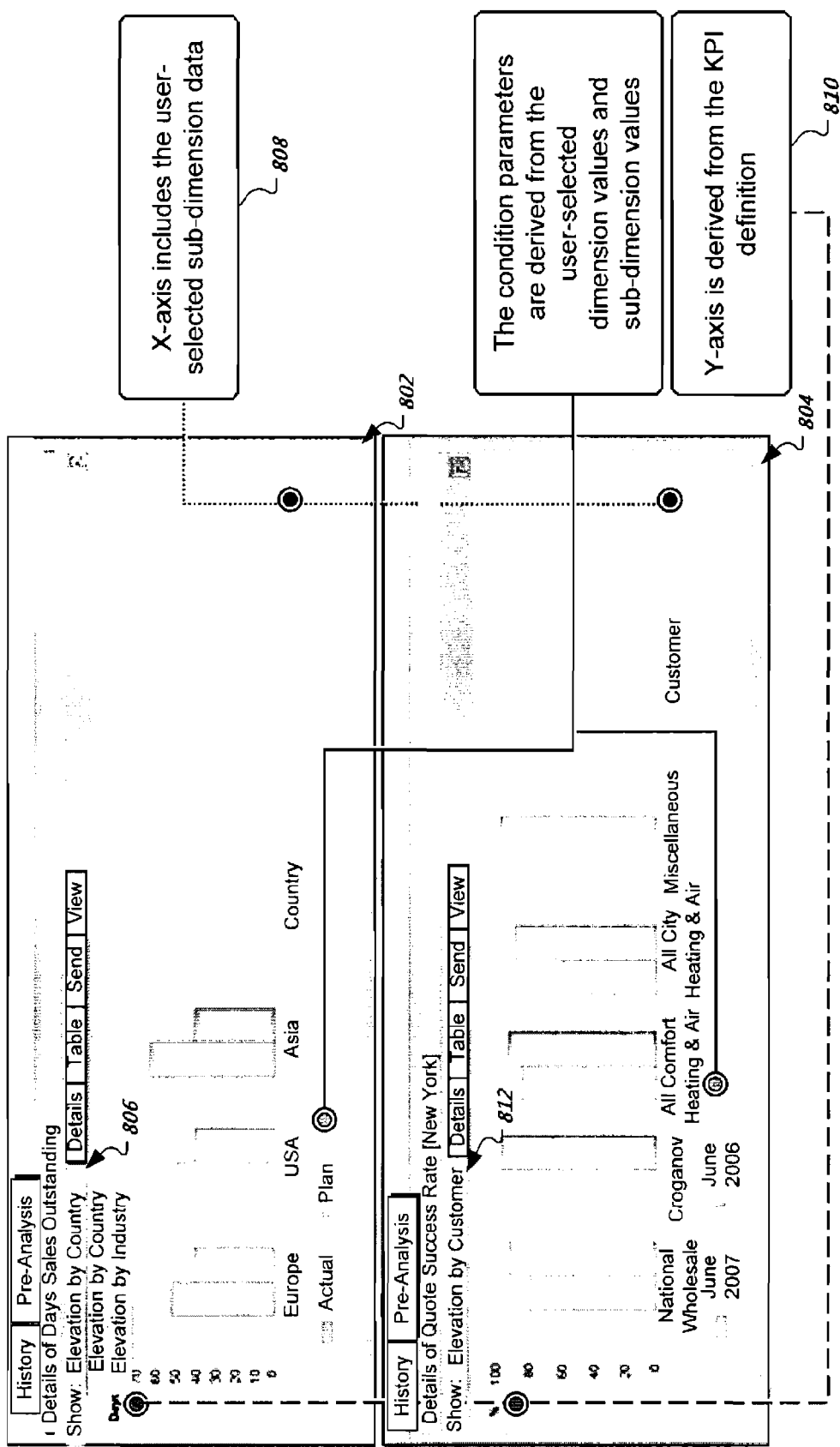
FIG. 8 is another collection of exemplary report views in graphical form.

FIG. 8 is another collection of exemplary report views in graphical form. In this example, two bar graphs 802 and 804 represent the performance history of the actual versus planned data for the "Days Sales Outstanding" KPI. The bar graphs 802 and 804 may be automatically derived and generated using the definition of the key performance indicator, information entered by the user, and dimension details from system 100. The software application 108 can dynamically generate one or more information consumer patterns (e.g., reporting formats) for a selected KPI. The information consumer patterns may be used to create KPI reports or report views without using a predefined report structure. In general, KPI reports may be generated using a first reporting format (e.g., data from the performance of a KPI), a second reporting format (e.g., rows of a table or a horizontal axis), and a third reporting format (e.g., columns of a table or a vertical axis).

In some implementations, the dimension details for the selected KPI can be used to provide reporting views based on a set of sub-dimensions. For example, the bar graph includes a drop down box 806 showing details of the "Days Sales Outstanding" KPI drilled down by Country. As shown in graph 802, European countries have been aggregated, and information associated with the various European countries appears collectively above the "Europe" label in the graph. Similarly, the Asian countries have been aggregated, and information associated with these countries appear collectively above the "Asia" label. Information pertaining to the United States, however, is not aggregated, and stands alone. As such, the depicted report view 802 includes two aggregated subsets of sub-dimensions, represented by "Europe" and "Asia," and one standalone sub-dimension (USA). In other implementations, other groupings or aggregations are possible. For example, various regional hierarchical aggregations can be used. In addition to continent and country aggregation, state, province, or territory aggregation may be provided. In the depicted example, the United States may be an aggregation of state sub-dimensions, each of which may be drilled down into in some implementations (to show information particular to New York or California, for example). The drop down box 806 also includes a selection for drilling down into the KPI report by Industry.

In the bar graph 802, an x-axis scale 808 (Country) may be automatically derived using the received dimension value that specifies certain of the sub-dimensions. A y-axis scale 810 (Days) can be automatically derived from the definition of the "Days Sales Outstanding" KPI. In various implementations, either the horizontal or vertical axis, or both, may be determined based on user-supplied information or selections. In some implementations, such as when a sub-dimension is not selected, the x-axis scale and the y-axis scale may be derived from the KPI definition.

The data set or sets used to create the bars in the bar graph 802 may be determined from the user-selected dimension values and sub-dimension values. For example, the user may previously configure the "Days Sales Outstanding" KPI evaluation to include a number of dimensions, some or all of which may be aggregated. One example dimension may include the "Sales" dimension where several sub-dimensions of the "Sales" dimension can be selected for the KPI report. For example, the "Sales" dimension can be aggregated across country, industry, sales group, product line, and more. The aggregated possibilities may be sub-dimensions made selectable in an automatically generated KPI report, for example.

In a similar fashion, the bar graph 804 can be generated using the same or different derived axes information and user-selected dimensions and sub-dimensions. For instance, the bar graph 804 depicts a report for a second dimension available in the "Days Sales Outstanding" KPI. The second dimension is a "Details of Quote Success in the New York Office" dimension. The derived x-axis 808 is shown as Customer, since the user selected drill down by Customer in a drop down 812. The definition-derived y-axis 810 is shown as a percentage, in this example. Similar to bar graph 802, the data set for the bar graph 804 may be derived from the user-selected information, including a dimension value or values, attributes, and a condition, in various implementations.

Figure 9:
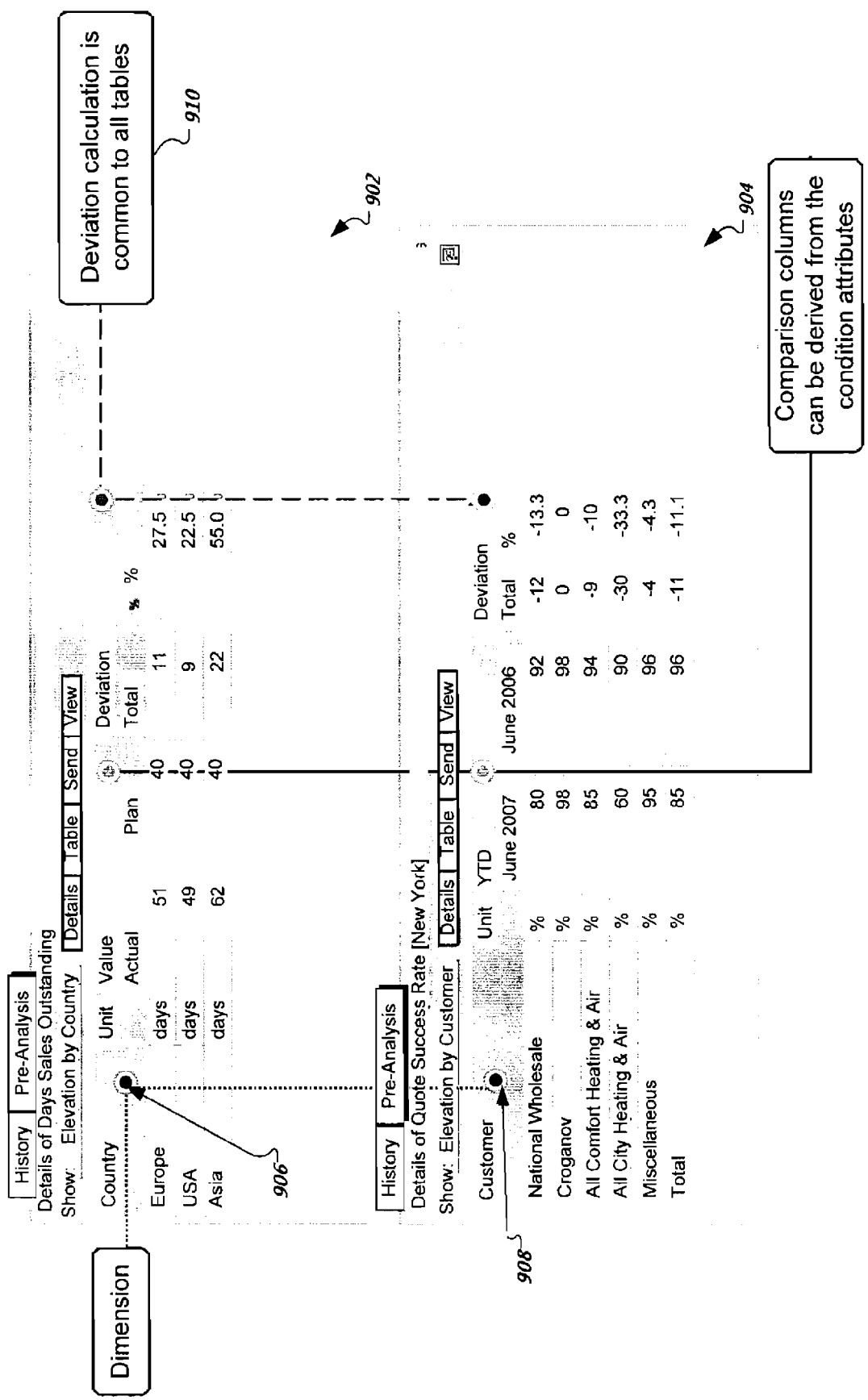
FIG. 9 is another collection of exemplary report views in tabular form.

FIG. 9 is another collection of exemplary report views in tabular form. The reports include a "Details of Days Sales Outstanding" table 902 and a "Details of Quote Success Rate [New York]" table 904. The table 902 depicts some or all of the data set used to create the bar graph 802 (FIG. 8). The system 100 can generate the tables 902 and 904 using user-selected dimensions and sub-dimensions. Specifically, the system 100 may use a selected dimension (e.g., an aggregated dimension), such as Country 906 (Table 902) or Customer 908 (Table 904) to determine the rows of data. Next, the system 100 may use dimension values that include the aggregated dimension (e.g., Country or Customer) in the rows of the table 902. Further, the system 100 may derive the values in the tables from the selected condition attributes.

The tables 902 and 904 both include a Deviation column 910 that provides a deviation calculation. In the example of table 902, the deviation calculation provides a deviation between the actual value and the planned value for the "Days Sales Outstanding" KPI shown drilled down by Country. In the example of table 904, the deviation calculation provides a deviation of the New York office Quote Success rate between a calendar year (June 2006 through June 2007)

In some implementations, data presented in the user interfaces 300-600 and 800-900 may include one or more linking mechanisms (e.g., hyperlinks) that, when selected, present one or more screens of system data. For example, a more detailed description corresponding to the data shown with the hyperlink can be displayed to the user. In some implementations, selecting the hyperlink may present more or less configuration options to the user.

Figure 10:
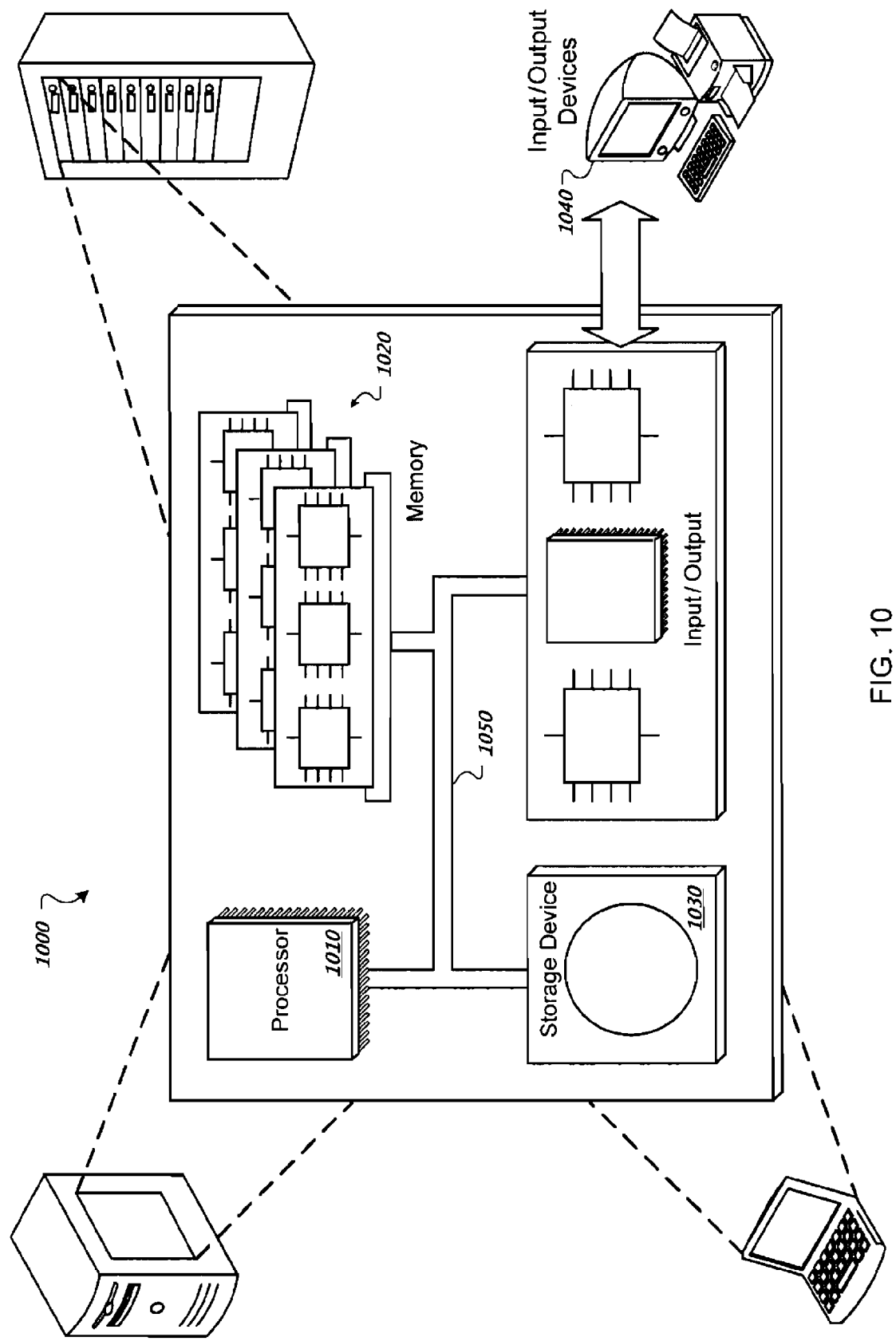
FIG. 10 is a block diagram of an exemplary computing system.

FIG. 10 is a block diagram of an exemplary computing system 1000 that can be used in connection with computer-implemented methods described in this document. The system 1000 can be used for the operations described in association with any of the computer-implement methods described previously, according to an implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory. By way of example, semiconductor memory devices such as EPROM, EEPROM, and flash memory devices, magnetic disks such as internal hard disks and removable disks, magneto-optical disks, and CD-ROM and DVD-ROM disks may be used. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user, and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for providing a report view, the method performed in connection with definition of a new evaluation of a predefined key performance indicator, the method comprising:

receiving, using a computer device, a selection of the predefined key performance indicator for which the new evaluation is to be defined, the predefined key performance indicator being associated with a plurality of predefined dimensions and with definitional data;

receiving, as a user selection for defining the new evaluation, a dimension value for at least one of the predefined dimensions;

receiving, as another user selection for defining the new evaluation, at least first and second attributes associated with the dimension value and a condition that defines a relationship between the first and second attributes, the new evaluation being defined to evaluate the predefined key performance indicator by comparing the first and second attributes with regard to the condition;

determining, using the computer device, a first aspect of a reporting format using the dimension value, first and second attributes, and the condition;

determining, using the computer device, second and third aspects of the reporting format using the definitional data; and displaying on a display device a report view formatted according to the reporting format having the first, second, and third aspects.

2. The method of claim 1, wherein the report view is a graph, and wherein the first aspect specifies data sets to be included in the graph, the second aspect specifies a horizontal axis of the graph, and the third aspect specifies a vertical axis of the graph.

3. The method of claim 1, wherein the report view is a table, and wherein the first aspect specifies data sets to be included in the table, the second aspect specifies rows of the table, and the third aspect specifies columns of the table.

4. The method of claim 1, further comprising retrieving a first data set associated with the predefined key performance indicator and the first attribute and a second data set associated with the predefined key performance indicator and the second attribute, and wherein the displaying the report view comprises formatting the retrieved first and second data sets according to the first, second, and third aspects.

5. The method of claim 4, wherein the second data set is a reference data set.

6. The method of claim 4, further comprising receiving a threshold value that qualifies the condition.

7. The method of claim 6, wherein the condition and the threshold value together define a relationship between the first data set and the second data set, and further comprising issuing an alert when the relationship is violated.

8. The method of claim 1, wherein the key performance indicator is stored in an electronic repository and made available for selection to a plurality of external systems.

9. A computer-implemented method for providing a report view, the method performed in connection with definition of a new evaluation of a predefined key performance indicator, the method comprising:

receiving, using a computer device, a selection of the predefined key performance indicator for which the new evaluation is to be defined, the predefined key performance indicator being associated with a plurality of predefined dimensions and with definitional data, wherein at least one of the predefined dimensions comprises a plurality of sub-dimensions;

receiving, as a user selection for defining the new evaluation, a dimension value for at least one of the predefined dimensions that comprises a plurality of sub-dimensions, the dimension value specifying certain of the sub-dimensions;

receiving, as another user selection for defining the new evaluation, at least first and second attributes associated with the dimension value and a condition that defines a relationship between the first and second attributes, the new evaluation being defined to evaluate the predefined key performance indicator by comparing the first and second attributes with regard to the condition;

determining, using the computer device, a first aspect of a reporting format using the dimension value, first and second attributes, and the condition;

determining, using the computer device, a second aspect of the reporting format using the received dimension value, the second reporting format specifying the certain sub-dimensions;

determining a third aspect of the reporting format using the definitional data; and displaying on a display device a report view formatted according to the reporting format having the first, second, and third aspects.

10. The method of claim 9, wherein the report view is a graph, and wherein the first aspect specifies data sets to be included in the graph, the second aspect specifies a horizontal axis of the graph, and the third aspect specifies a vertical axis of the graph.

11. The method of claim 9, wherein the report view is a table, and wherein the first aspect specifies data sets to be included in the table, the second aspect specifies rows of the table, and the third aspect specifies columns of the table.

12. The method of claim 9, further comprising retrieving a first data set associated with the predefined key performance indicator and the first attribute and a second data set associated with the predefined key performance indicator and the second attribute, and wherein the displaying the report view comprises formatting the retrieved first and second data sets according to the first, second, and third aspects.

13. The method of claim 12, further comprising receiving a threshold value that qualifies the condition.

14. The method of claim 13, wherein the condition and the threshold value together define a relationship between the first data set and the second data set, and further comprising issuing an alert when the relationship is violated.

15. A computer program product tangibly embodied in a computer-readable medium and comprising instructions that when executed by a processor perform a method for providing a report view, the method performed in connection with definition of a new evaluation of a predefined key performance indicator, the method comprising:

receive a selection of the predefined key performance indicator for which the new evaluation is to be defined, the predefined key performance indicator being associated with a plurality of predefined dimensions and with definitional data;

receive, as a user selection for defining the new evaluation, a dimension value for at least one of the predefined dimensions;

receive, as another user selection for defining the new evaluation, at least first and second attributes associated with the dimension value and a condition that defines a relationship between the first and second attributes, the new evaluation being defined to evaluate the predefined key performance indicator by comparing the first and second attributes with regard to the condition;

determine a first aspect of a reporting format using the dimension value, first and second attributes, and the condition;

determine second and third aspects of the reporting format using the definitional data; and display on a display device a report view formatted according to the reporting format having the first, second, and third aspects.

16. The method of claim 15, wherein the report view is a graph, and wherein the first aspect specifies data sets to be included in the graph, the second aspect specifies a horizontal axis of the graph, and the third aspect specifies a vertical axis of the graph.

17. The method of claim 15, wherein the report view is a table, and wherein the first aspect specifies data sets to be included in the table, the second aspect specifies rows of the table, and the third aspect specifies columns of the table.

18. The method of claim 15, further comprising instructions that when executed retrieve a first data set associated with the predefined key performance indicator and the first attribute and a second data set associated with the predefined key performance indicator and the second attribute, and wherein the displaying the report view comprises formatting the retrieved first and second data sets according to the first, second, and third aspects.

19. The method of claim 18, further comprising instructions that when executed receive a threshold value that qualifies the condition.

20. The method of claim 19, wherein the condition and the threshold value together define a relationship between the first data set and the second data set, and further comprising instructions that when executed issue an alert when the relationship is violated.

* * * * *